United States Patent [19]

Ishida et al.

[11] Patent Number: 4,899,973
[45] Date of Patent: Feb. 13, 1990

[54] MOUNTING MEMBER

[75] Inventors: Takeshi Ishida; Kazuhiko Kawazoe, both of Kobe, Japan

[73] Assignee: Kawasaki Jukogyo Kabushiki Kaisha, Hyogo, Japan

[21] Appl. No.: 208,916

[22] Filed: Jun. 20, 1988

Related U.S. Application Data

[63] Continuation-in-part of Ser. No. 38,114, Apr. 14, 1987, Pat. No. 4,752,055.

[30] Foreign Application Priority Data

Apr. 16, 1986 [JP] Japan .................................. 61-085882

[51] Int. Cl.⁴ .............................................. A47F 5/00
[52] U.S. Cl. ...................................... 248/298; 248/287
[58] Field of Search ...................... 248/287, 298, 295.1, 248/297.2, 660, 662, 669, 674; 410/150, 104, 105; 411/265, 284, 984, 991, 992, 993

[56] References Cited

U.S. PATENT DOCUMENTS

| | | | |
|---|---|---|---|
| 1,281,699 | 10/1918 | Swan | 248/298 X |
| 1,324,867 | 12/1919 | Wilson | 411/984 X |
| 2,610,011 | 9/1952 | Lemmerman | 248/287 U X |
| 3,038,417 | 6/1962 | Waller | 410/150 |
| 3,465,996 | 9/1969 | Wedel | 248/287 |
| 3,513,606 | 5/1970 | Jones | 248/297.2 X |
| 3,850,113 | 11/1974 | Sichak | 410/104 |
| 4,560,130 | 12/1985 | Schwartz | 248/297.2 |
| 4,602,756 | 7/1986 | Chatfield | 410/105 X |

Primary Examiner—J. Franklin Foss
Attorney, Agent, or Firm—Schwartz & Weinrieb

[57] ABSTRACT

A mounting member is improved in durability, allows an article to be mounted at a desired position of a structure and eliminates the necessity of a special mechanism for preventing rotational movement of a fastening member. The mounting member has a sloped portion formed adjacent each of a pair of transverse corner portions defined between flanges and webs thereof for preventing turning movement of the head of a rotational member disposed within a groove defined by means of the webs and the flanges. If the head of a fastening member is inserted into the groove through means of an opening defined between the flanges and then the fastening member is rotated through means of an angle of approximately 90 degrees about its axis within the groove, the head of the fastening member is interposed between the fastened portions and prevented from rotation about its axis.

8 Claims, 6 Drawing Sheets

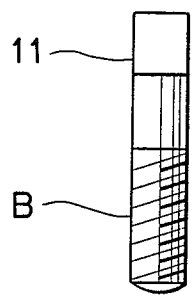
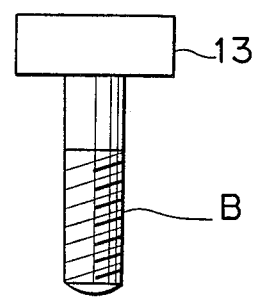
FIG. 3b    FIG. 3a
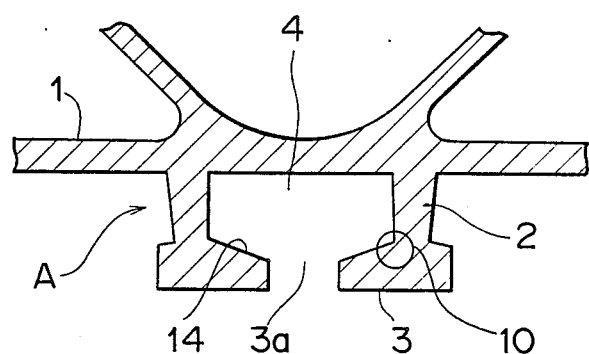
FIG. 4

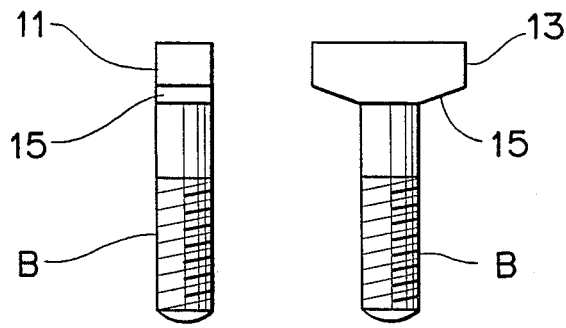
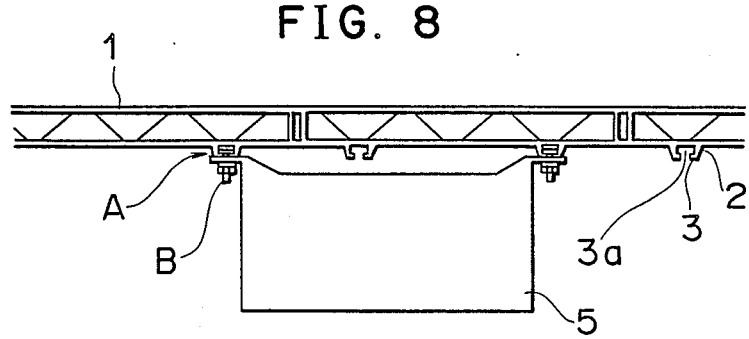

MOUNTING MEMBER

This application is a continuation-in-part of U.S. Ser. No. 038,114 by Takeshi Ishiba et al, filed Apr. 14, 1987 now U.S. Pat. No. 4,752,055.

FIELD OF THE INVENTION

This invention relates to a mounting member formed upon a structure for mounting an article thereon.

BACKGROUND OF THE INVENTION

Conventionally, a structure on which an article is to be mounted has formed thereon a mounting member A as shown in FIGS. 8 and 9. The mounting member A includes a pair of webs 2 extending downwardly substantially parallel to each other from a lower surface of the structure 1, and a pair of flanges 3 extending mutually inwardly from and transversely to the lower ends of the webs 2 so as to define therebetween a slot 3a. It is to be noted that the structure shown in FIG. 8 serves as the floor of a vehicle and an article is required to be mounted upon the structure.

A groove 4 having a substantially rectangular cross section is defined by and between the webs 2 and the flanges 3 of the mounting member A, as well as by means of the lower surface of structure 1. A head 7 of a bolt B for fastening a flange 6 of an article 5 to the mounting member A is fitted within the groove 4, and the bolt B is fastened to the mounting member A by means of a nut 8 tightened upon the bolt B.

Accordingly, when the nut 8 is tightened onto the bolt B, it is necessary to prevent the bolt B from rotating about its axis. To this end, the head 7 of the bolt B is normally shaped and dimensioned so that it defines a closely toleranced fit within the groove 4. Thus, where the head 7 of the bolt B used has a regular square shape, either a method wherein the head 7 is inserted into the groove 4 from one end thereof and then slid therealong to a predetermined position of the groove 4 or another method wherein a cutaway portion 9 for admitting the head 7 of the bolt B therethrough is provided at a suitable position of the flanges 3 may be used. However, according to the former method, the head 7 of the bolt B cannot be inserted into the groove 4 if the end portion of the groove 4 is blocked, while according to the latter method, a manufacturing step for forming the cutaway portion 9 is required and the article 5 cannot be mounted at the position of the cutaway portion 9.

In order to resolve such disadvantages as described above, a method as illustrated in FIG. 8 has also been devised wherein the head 7 of the bolt B has a deformed rectangular or substantially parallelogram shape such that the width or the dimension of the shorter side thereof may allow the head 7 to be inserted through the slot 3a between the flanges 3 and the head 7 after having been disposed within the groove 4 may be turned through means of an angle of approximately 90 degrees about its axis in the direction indicated by the arrows within the groove 4 until it is closely fitted within the groove 4. It is self-evident that this method involves a complexly shaped head 7 of the bolt B, which results in high production costs for the bolt B.

Furthermore, in the case of the mounting member A described above, when the article 5 is secured thereto, the stress at the crossing or connecting corner portions 10 defined between the flanges 3 and the webs 2 is increased so that where the mounting member A is formed by extrusion molding of a conventionally used aluminum material, as shown in FIG. 11, a crack C may appear at such corner portions 10 depending upon the fastening torque or the condition of the load applied thereto, which will be a significant problem with respect to the mechanical strength of the mounting member A.

OBJECTS OF THE INVENTION

It is an object of the present invention to provide a mounting member which is improved in durability.

It is another object of the invention to provide a mounting member wherein the necessity of providing a cutaway portion thereon an be eliminated and an article can be mounted at any desired position of the structure by means of a fastening member.

It is a further object of the invention to provide a mounting member which eliminates the necessity of a special mechanism for preventing the rotational motion of the fastening member.

SUMMARY OF THE INVENTION

In order to attain the objects described above, according to the present invention, there is provided a mounting member for supporting a fastening member comprising a substantially horizontal support surface; a pair of elongate webs depending from the support surface; a pair of flanges extending inwardly toward each other from, and transversely to, free ends of the pair of webs so as to define a slot between inner opposed extremities thereof; the fastening member having in a plan view a rectangular head portion which has a pair of longer sides and a pair of shorter sides; the support surface, the inner side surfaces of the pair of webs, and the pair of flanges defining therebetween a groove which has a width greater than the slot defined between the opposed extremities of the flanges in such a manner as to allow insertion of the head portion of the fastening member into the groove when the longer sides of the head portion is oriented substantially along the slot, the width of the groove allowing rotational movement in a horizontal plane of the portion of the fastening member therebetween; and a pair of enlargements formed at a lower portion of the groove and within corner portions defined between the inner sidewall surfaces of the pair of webs and the flanges extending therefrom, the pair of enlargements extending along the groove and allowing the head portion of the fastening member to rest in the lower groove portion when the fastening member is orientated with the shorter sides being substantially along the lower portion of the groove but preventing the rotational movement of the fastening member in the lower portion of the groove while providing an increased mechanical strength to the corner portions so as to withstand bending moments impressed thereon by means of loads attached to the fastening member.

BRIEF DESCRIPTION OF THE DRAWINGS

The above and other objects, features and advantages of the present invention will become apparent from the following description and the appended claims, taken in conjunction with the accompanying drawings, in which like reference characters designate like or corresponding parts throughout the several views, and wherein:

FIG. 3a and 3b are a front elevational view and a side elevational view, respectively, of a fastening member for use with the mounting member of FIG. 1;

FIG. 4 is a vertical sectional view of a mounting member according to another embodiment of the invention;

FIGS. 5a and 5b are a front elevational view and a side elevational view, respectively, of a fastening member for use with the mounting member of FIG. 4;

FIG. 8 is an illustrative view of a conventional arrangement of an article mounting structure and article mounted on the structure;

DETAILED DESCRIPTION OF THE PREFERRED EMBODIMENTS

Figure 1:
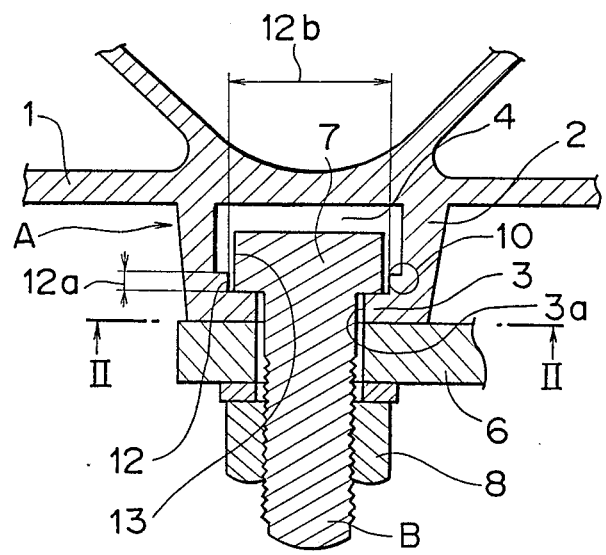
FIG. 1 is a vertical sectional view of a mounting member according to one embodiment of the present invention.
Figure 2:
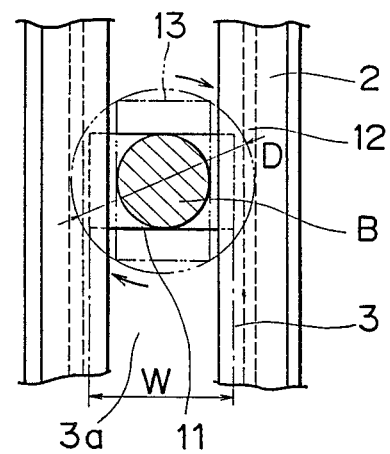
FIG. 2 is a sectional view taken along line II—II of FIG. 1.

Referring first to FIGS. 1 and 2, there is shown a mounting member according to a first embodiment of the present invention. It is to be noted that, in FIGS. 1 and 2 and also in FIG. 3, like elements or components are denoted by like reference numerals or symbols to those of the conventional arrangement shown in FIGS. 8 to 10.

A mounting member generally denoted at A is formed upon a structure 1 having a horizontal support surface and includes a pair of webs 2 depending therefrom and a pair of flanges 3 extending mutually inwardly from and transversely to lower free ends of the webs 2. A slot 3a is defined between inner opposed extremities of the flanges 3, and a groove 4 is defined by and between the pair of webs 2 and the pair of flanges 3 as well as the undersurface of structure 1.

A fastening member may be, for example, a bolt B which has a rectangular head in a plan view. In FIGS. 2, 3a and 3b, the bolt B shown has longer sides 11 and shorter sides 13. The shorter sides 13 of the head of the bolt B are dimensioned so as to allow the head of the bolt B to be inserted into the groove 4 through means of the slot 3a between the flanges 3.

Meanwhile, a pair of enlargements 12 in the form of steps or shoulders are formed in an opposing relationship to each other adjacent to and along corner portions 10 of the flanges 3 with respect to the webs 2 by increasing the thickness of the flanges 3 inwardly of the groove 4 and relative to the interior sidewall surfaces of the webs 2 as seen in FIG. 1. The distance 12b between opposing faces of the stepped portions 12 and the height 12a of the stepped portions 12 are dimensioned so that the longer sides 11 of the bolt B may be cleared from the stepped portions 12 but the head is prevented from rotating about its axis, as a result of encountering the stepped portions 12 while the upper portion of the groove 4 above the stepped portions 12 in FIG. 1 is dimensioned so as to allow a rotating motion of the head in spite of the longer sides 11 thereof about the bolt axis within the groove 4. In other words, the distance 12b is larger than the size W of the longer sides 11 of the bolt head 7 but smaller than the diameter D of the circumscribed circle of said bolt head 7 so as to satisfy the relationship $W < 12b < D$.

Accordingly, after head 7 of the bolt B is inserted into the groove 4 with the shorter sides 13 oriented parallel to the slot 3a defined between the flanges 3 of the mounting member A, and then the bolt B is rotated through means of an angle of approximately 90 degrees in the direction of the arrow marks (refer to FIG. 2) about its axis in the upper part of the groove, the head 7 will drop down into the space defined between the opposing faces of the stepped portions 12 formed upon the flanges 3. Consequently, the head 7 of the bolt B is prevented from rotating about its axis by means of the stepped portions 12 due to the size of the longer sides 11. Accordingly, when a hole formed in a flange 6 of an article 5 is disposed about the bolt B and then a nut 8 is tightened upon the bolt B, the article 5 will be secured to the mounting member A of the structure 1.

Figure 9:
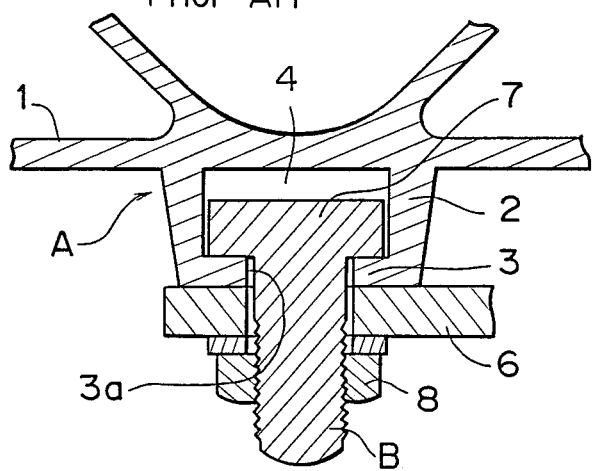
FIG. 9 is a vertical sectional view of a conventional mounting member.
Figure 10:
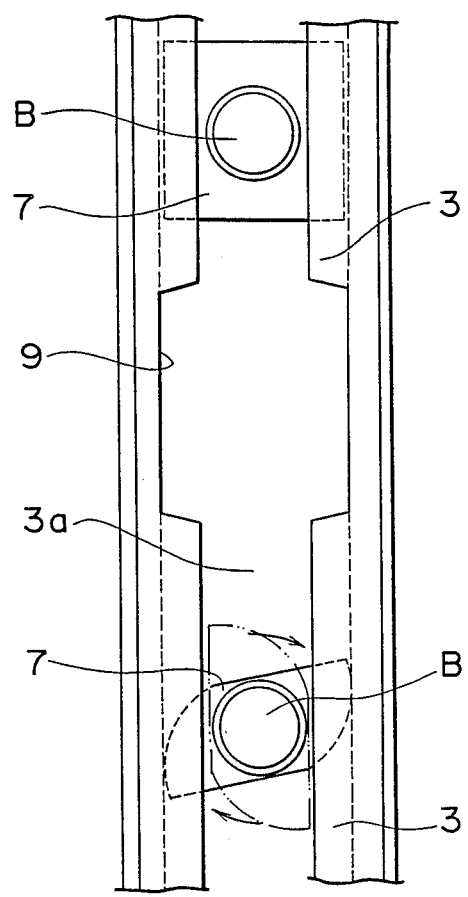
FIG. 10 is an illustrative view showing a relationship between the mounting member of FIG. 9 and the fastening member.

Accordingly, the tendency of the bending moment impressed upon the flanges 3 will be as shown in FIG. 9, and the value M2 of the bending moment within the flanges 3 is less than the value M1 where the stepped portions 12 are not provided, which means that the mechanical strength is increased by means of the stepped portions 12.

Referring now to FIG. 4, there is shown a mounting member according to another embodiment of the present invention. Also in FIG. 4 and in FIG. 5, like elements or components are denoted by like reference numerals or symbols with respect to those of the arrangement shown in FIGS. 6 to 9.

In the embodiment shown in FIG. 4, the reinforcement is provided by sloped portions 14 in the flanges 3 of the mounting member A such that the flanges 3 may gradually increase in thickness from the inner opposing extremities thereof between which the slot 3a is defined toward the corner portions 10 defined between the flanges 3 and webs 2 of the mounting member A. Furthermore, the bolt B for use mounting member A has a rectangular head having longer sides 11 and shorter sides 13 and which has a pair of inclined faces 15 formed upon lower portions thereof which are contiguous to a pair of end faces thereof as shown in FIGS. 5a and 5b.

Figure 6:
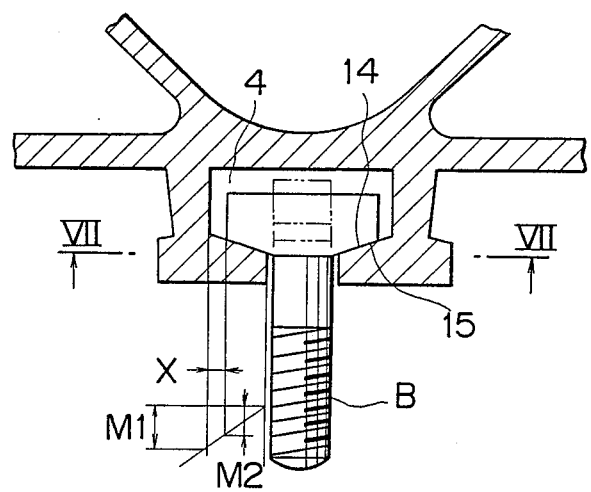
FIG. 6 is a vertical sectional view showing the state in which the bolt shown in FIGS. 5a and 5b is used in the mounting member of FIG. 4.
Figure 7:
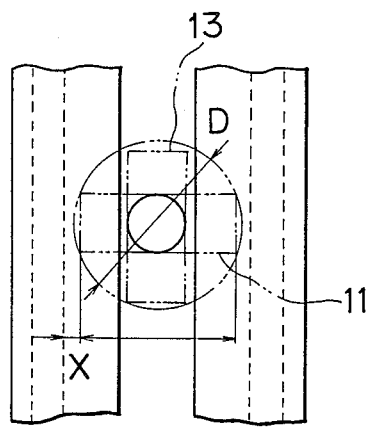
FIG. 7 is a sectional view taken along line VII—VII of FIG. 6.

As shown in FIGS. 6 and 7, the relationship $D > W$ is self-explanatory in this embodiment, in which a wider space than D needed for the bolt head is not provided in the lower part of the groove 4 because part of the sloped portions 14 in the areas sized X between the inner wall surfaces of the webs 2 and the longitudinal ends of the bolt head 7 interferes with the rotational movement thereof.

The surface of the sloped portions 14 and that of the inclined faces 15 of the head of the bolt B are complementary with respect to each other so that they may slidably contact each other while they function to prevent rotational movement of the bolt B about its axis when a nut 8 is tightened thereon.

Figure 11:
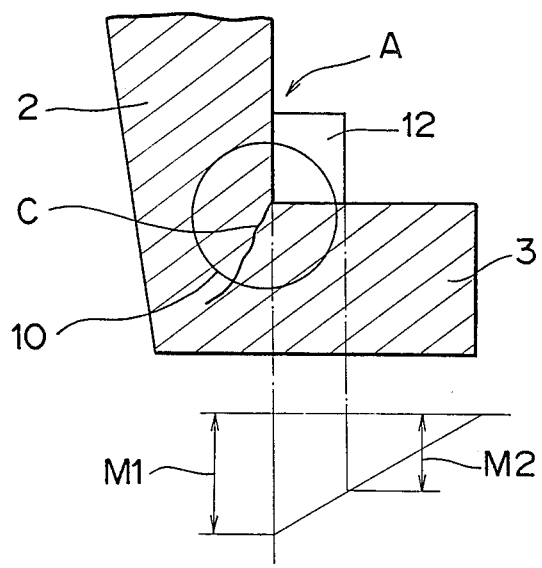
FIG. 11 is a vertical sectional, diagrammatic view illustrating a bending moment as applied to a flange of the mounting member.

More particularly, it is to be especially noted that the inclined surfaces 14 of the flanges 3 are simply flat inclined or sloped surfaces, and the inclined surfaces 15 of the bolt head are similarly formed. As a result of such complimentary surfaces, when the surfaces 15 of the bolt head are disposed upon the surfaces 14 of the flanges 3 as shown in FIG. 6, and the nut 8 is tightened upon the lower end of bolt B, rotation of the bolt B relative to the structure 1 is effectively prevented because of, in effect, the interengagement of the inclined surfaces 15 of the bolt head with the inclined surfaces 14 of the structural member flanges 3. Such relatively or complimentary inclined or slopes surfaces occurs only substantially within the longitudinal plane of the bolt head which is defined substantially parallel to the longitudinal sides 11 of the bolt head, and does not occur in a conical arrangement which would otherwise in fact facilitate or permit relative rotation of the bolt head with respect to the flanges 3. As a result of such foregoing structure, results in the embodiment of FIGS. 6 and 7 are obtained in a manner similar to that of the embodiment of FIGS. 1 and 2, that is, relative rotation between the bolt and the flanges 3 is effectively prevented while simultaneous disposing or seating the end faces 13 of the bolt head at a substantial distance from the interior faces of the webs 2 so as to achieve the advantageous moment distribution diagrammatically illustrated within FIG. 11 whereby cracking or other deleterious effects upon the mounting member A are substantially reduced or eliminated.

Obviously, many modifications and variations of the present invention are possible in light of the above teachings. It is therefore to be understood that within the scope of the appended claims, the present invention may be practiced otherwise than as specifically described herein.

What is claimed is:

1. A mounting member for supporting a fastening member, comprising:
    a substantially horizontal support surface;
    a pair of elongate webs depending from said support surface;
    a pair of flanges extending inwardly toward each other from, and transversely to, free ends of said pair of webs so as to define a slot between inner opposed extremities thereof;
    said fastening member having in a plan view a rectangular head portion which has a pair of longer sides and a pair of shorter sides;
    said support surface, inner side surfaces of said pair of webs, and said pair of flanges defining therebetween a groove which has a width greater than said slot defined between said opposed extremities of said flanges in such a manner as to allow insertion of said head portion of said fastening member into said groove when said longer sides of said head portion are oriented substantially along said slot, said width of an upper portion of said groove allowing rotational movement in a horizontal plane of said head portion of said fastening member therebetween; and
    a pair of enlargements formed within a lower portion of said groove and within transversely spaced corner portions of said groove defined between said inner sidewall surfaces of said pair of webs and said flanges extending therefrom, said pair of enlargements extending longitudinally along said groove and including a pair of sloped portions, and allowing longitudinally opposite end portions of said head portion of said fastening member to rest within said lower groove portion when said fastening member is orientated with said shorter sides being disposed substantially parallel to said inner sidewall surfaces of said pair of webs along said lower portion of said groove but preventing said rotational movement of said fastening member within said lower portion of said groove as a result of said longitudinally opposite end portions of said head portion of said fastening member having respective undersurface inclined, sloped surfaces which are complementary to said pair of sloped portions portions of said enlargements while providing increased mechanical strength to said corner portions of said groove so as to withstand bending moments impressed thereon by means of loads attached to said fastening member due to the inward disposition of said head portion of said fastening member relative to said inner sidewall surfaces of said pair of webs.

2. A mounting member as set forth in claim 1, wherein:
    said fastening member has a substantially T-shaped cross-sectional configuration; and
    said groove and said slot defined between said pair of webs and said pair of flanges together define a substantially T-shaped opening for accommodating said substantially T-shaped fastening member.

3. A mounting member as set forth in claim 1, wherein:
    said enlargements comprise sustantially right-triangle means wherein said sloped portions of said enlargements comprise hypotenuse portions of said right-triangle means.

4. A mounting member as set forth in claim 1, wherein:
    said sloped portions of said enlargements have a predetermined longitudinal extent so as to define longitudinally extending rail means upon which said opposite end portions of said head portion of said fastening member may be supported at any one of an infinite number of longitudinally adjusted positions along said enlargement rail means.

5. A mounting means as set forth in claim 1, wherein:
    said depending webs and said support surface are integrally formed together.

6. A mounting member as set forth in claim 5, wherein:
    said inwardly disposed flanges and said webs are integrally formed together.

7. A mounting member as set forth in claim 1, wherein:
    said inwardly disposed flanges and said webs are integrally formed together.

8. A mounting member as set forth in claim 1, wherein:
    a diagonal dimension, as defined between opposite corners of said rectangular head portion of said fastening member, is less than said width of said upper portion of said groove so as to permit said fastening member to be rotated within said upper portion of said groove.

* * * * *